United States Patent [19]
Fernandes et al.

[11] 3,749,308
[45] July 31, 1973

[54] BY-PASS CONTROL MECHANISM

[75] Inventors: Joseph F. Fernandes; Robert R. Pfouts, both of Dayton; Thomas J. Lord, Middletown, all of Ohio

[73] Assignee: United Aircraft Products, Inc., Dayton, Ohio

[22] Filed: Oct. 16, 1970

[21] Appl. No.: 81,206

[52] U.S. Cl. ................... 236/93, 137/612, 251/298, 236/34.5
[51] Int. Cl. ............................................ F01p 7/12
[58] Field of Search ....................... 236/34.5, 35, 93; 165/40, 35; 137/612, 625.42, 625.44, 625.46, 625.45; 98/38 B, 299, 300; 251/298

[56] References Cited
UNITED STATES PATENTS

| | | |
|---|---|---|
| 3,123,297 | 3/1964 | Lipscombe et al. ............... 236/93 X |
| 3,295,759 | 1/1967 | Wing ....................................... 236/93 |
| 3,578,283 | 5/1971 | Jones .................................... 251/298 |
| 3,618,508 | 11/1971 | Tutt ..................................... 236/13 X |
| 1,128,846 | 2/1915 | Carroll ............................. 251/160 X |
| 2,701,102 | 2/1955 | Albrecht ........................ 236/34.5 X |
| 3,166,052 | 1/1965 | Parsons ............................ 123/41.05 |
| 3,373,771 | 3/1968 | Boyen .............................. 137/612 X |

*Primary Examiner*—William E. Wayner
*Attorney*—J. E. Beringer

[57] ABSTRACT

A by-pass mechanism including a door formed as a segment of a cylinder and mounted for swinging motion to alternate fluid flow control positions. A power element responsive to a changing condition of the controlled fluid is arranged for direct actuation of the door, with mechanical advantage. The door, and a mounting frame therefor, are constructed to impose minimal resistance to movement of the door in its travel to and from the alternate positions.

15 Claims, 6 Drawing Figures

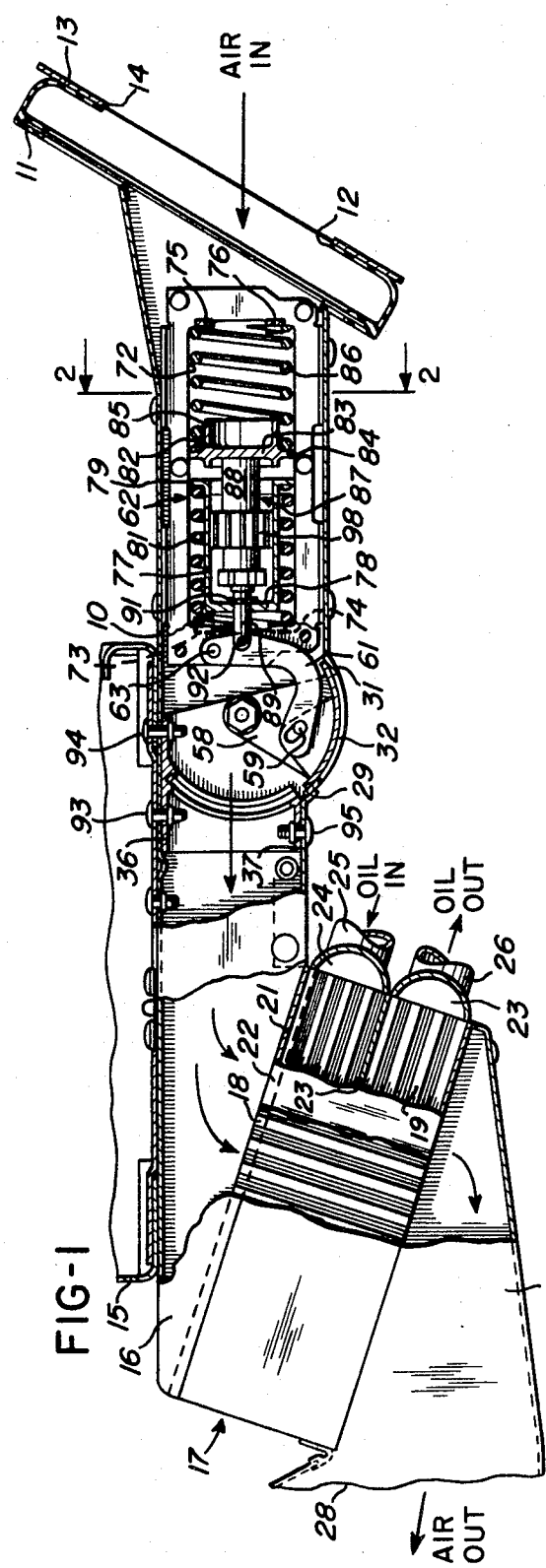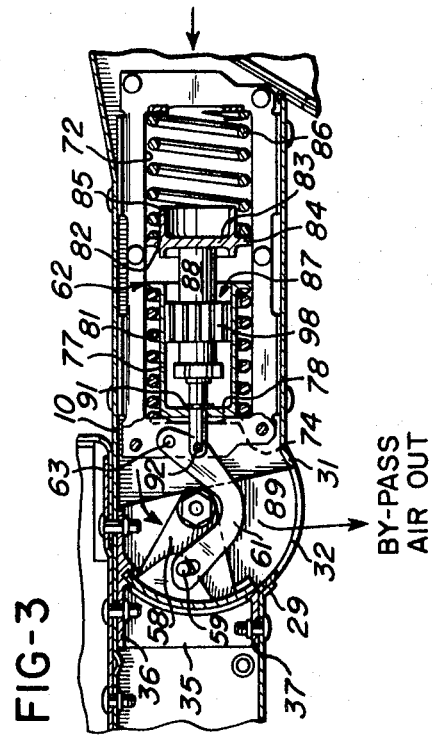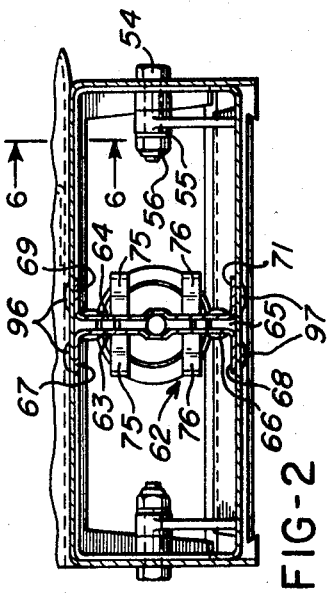

INVENTORS
JOSEPH F. FERNANDES
ROBERT R. PFOUTS
THOMAS J. LORD
BY
THEIR ATTORNEY

BY-PASS CONTROL MECHANISM

BACKGROUND OF THE INVENTION

This invention relates to by-pass mechanisms, and has particular though not limited reference to direct action apparatus wherein a thermally sensitive or like device is connected for direct actuation of a movable fluid flow control member.

An aircraft application arises from the use therein of external or ram air as a coolant. Thus, a duct is opened to the exterior of the aircraft, and, in the flight of the aircraft receives a flow of ambient air. The duct leads to a heat exchanger where the air and another fluid, for example an engine or hydraulic oil, pass in heat transfer relation, the flowing air cooling the flowing oil. It is useful to be able to restrict air flow to the heat exchanger and this is in fact requisite at high speeds. Compressability effects produce a steep rise in air temperature, making the air unsuitable for use as a coolant. Indeed a positive shutting off of air to the heat exchanger may be desirable to avoid adding heat to the oil instead of removing it, especially when it may be acceptable to use uncooled oil for a limited time whereas the addition of heat to the oil is intolerable.

In dealing with this problem a designer of aircraft accessories has available to him known flap and shutter control mechanisms by which air flow through a duct can be controlled. All of these have serious disadvantages, however, including imperfect closure, lack of a by-pass connection, and the presence of unbalanced forces unduly magnifying the work to be performed. Powerful actuators, servo-motors and the like have excessive weight or bulk or both and are preferably excluded from an aircraft environment.

SUMMARY OF THE INVENTION

The instant invention affords a by-pass mechanism which while of general utility has unique value in an aircraft installation as described. Instead of a flap or shutter type closure it uses a door constructed as a segment of a cylinder. Its movement is not counter to the air flow and in either alternate position of adjustment it is not subject to air currents attempting to move it in an opposite sense. A window in the duct is open for by-passing flow of the air when the door is in a position closing the duct and is itself closed by the door when in its alternate position. The door and a frame in which it moves have a special truncated configuration minimizing contact therebetween except at extremes of door movement, and have further a cooperative relation substantially to seal the door against flow to the heat exchanger when in a duct closing position. Power for movement of the door comes from a power-type thermostat stationed in the duct to be affected by the air temperature whether flow is through to the heat exchanger or to and through the by-pass window. A direct actuating connection, including a provision for motion amplification, is possible by virtue of the construction and arrangement substantially relieving the door of air flow and friction induced stresses. A small, light weight thermostat, available in a commercial form, is suitable for the purpose.

An object of the invention is to provide a by-pass mechanism characterized as to novelty and purpose in the respects noted.

Other objects and structural details of the invention will appear from the following description, when read in connection with the accompanying drawings, wherein:

FIG. 1 is a view in side elevation, partly broken away and in fragmentary form, showing a by-pass mechanism in accordance with the illustrated form of the invention;

FIG. 2 is a view in cross section, taken substantially along the line 2—2 of FIG. 1, some portions of the structure being omitted;

FIG. 3 is a detail view like FIG. 1, showing the by-pass mechanism in an alternate position of adjustment;

Figure 4:
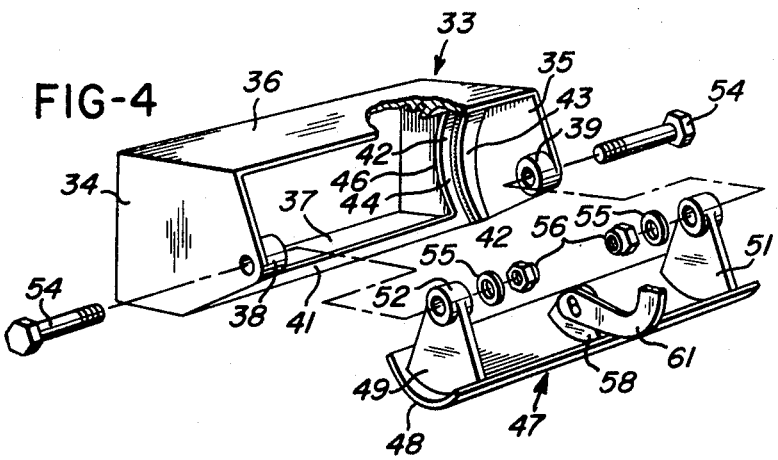
FIG. 4 is an exploded view in perspective of a door and frame assembly comprised in the by-pass mechanism.

Referring to the drawings, in its illustrative embodiment by-pass mechanism in accordance with the invention operates in or in connection with a duct 10 which at its one end terminates in a flexible boot 11 defining an open mouth 12. The boot 11 seats sealingly to a structural member 13 having an opening 14 substantially to align with mouth 12. The opening 14 and aligned mouth 12 define an air inlet, the duct 10 being disposed to accept ram air therethrough.

The duct 10 has an elongate form and is in part suspended from a fixture 15. At its end opposite boot 11, it terminates in a manifold 16 seating in a closing relation to one face of a heat exchanger 17. The latter has a generally conventional plate type construction, presenting airway fins 18 and oilway fins 19 in a generally countercross flow relation. Separation means including side channels 21 and partition plates 22 segregate the air and oil flows. A divider 23 enforces a circuitous flow over the oilways 19 across the back in the heat exchanger, as from a manifold 24 to a manifold 23. Conduits 25 and 26 lead the oil respectively from and back to a place of use. Air in the manifold 16 flows over airways 18 through the heat exchanger 17, collects in a manifold 27 fastened to the opposite face of the heat exchanger and discharges overboard or to exhaust as through an outlet 28.

In a lower part thereof, intermediate its ends, the duct 10 is interrupted in a manner to provide an overlap 29. A portion of the duct extending from the overlap 29 toward the air inlet end is depressed to form an arcuate section 31. In section 31 is an open window 32.

The duct 10 is rectangular in cross section, as indicated in FIG. 2. Within the duct, adjacent to and beyond the window 32, in relation to the direction of air flow through the duct, is a frame 33 of corresponding rectangular configuration. As shown more particularly in FIG. 4, the frame 33 has end walls 34 and 35 adapted substantially to seat against internal side walls of the duct 10. An upper wall 36 and a lower wall or floor 37 interconnect the side walls 34 and 35 and similarly are adapted substantially to seat to corresponding internal walls of the duct. The frame is open from front to back. Leading edges of the end plates 34 and 35 taper forwardly and at their extremities mount inwardly facing studs 38 and 39. At the leading edge of floor 37 is an inclined surface 41. At one end thereof the surface 41 terminates in a ledge 42 projecting perpendicularly from end wall 35 and curving arcuately thereof upwardly to merge with upper wall 36. At its opposite end, surface 41 merges with a similarly contoured ledge (not shown) on the inner face of wall 34. Also on the walls 34 and 35 and in a spaced relation to the ledges 42 thereon are perpendicular ledges 43 which define with the ledges 42 arcuate grooves 44. On the under surface of plate 36 ledges 42 and 43 extend transversely thereof and define a groove 45.

The frame 33 accordingly presents in duct 10 a through opening 46 precisely defined by the surface 41 and ledges 42 and 43. The portions of ledges 42 and 43 vertically disposing on end walls 34 and 35 having a convergent-divergent relationship in a manner to give opening 46 a truncated or trapezoidal configuration wherein the parallel sides of the trapezoid are represented by surface 41 and an overlying edge as represented by transverse ledges 42 and 43 on the underside plate 36.

The frame 33 may have a fabricated construction but in the illustrated instance is made in one piece in a suitable forming operation.

The studs 38 and 39 accordingly are integral with the frame 33. They serve as mounting locations for a multisided door 47 adapted in an arcuate, rocking motion to move to alternate positions of adjustment in one of which it closes off flow through the opening or passage 46 while opening flow through window 32 and in another of which it is reversely effective. The door 47 comprises a generally rectangular blade portion 48 constructed as a segment of a cylinder to have a curvature corresponding to the curvature of ledges 42 and 43. It has, moreover, a trapezoidal configuration substantially matching that of opening 46 or more particularly an outline as defined by groove means 44-45. Adjacent its side edges, on the concave side thereof, blade portion 48 has upstanding segmental members 49 and 51 terminating at their apex portions in respective cylindrical bearing studs 52 and 53. In the mounting thereof in frame 33, the door 47 is positioned to align bearing portions 52 and 53 with stud portions 38 and 39 on the frame. In each instance, a suitable pivotal connection is provided, as for example by a bolt 54, washer 55 and lock nut 56.

The pivot studs 38 and 39 on frame 33 occupy a position of approximate vertical alignment with window 32 and of horizontal alignment with frame opening 46. The arrangement is one to position blade portion 48 of the door 47 for motion in a circumferential path which will carry it into and out of groove 44 and into and out of a seat in depressed portion 31 of duct 10 wherein window 32 appears. According to the truncated or trapezoidal configuration of the blade 48 it moves in groove 46 in substantially noncontacting relation to ends thereof and to ledges 42 and 43 until reaching substantially a limit of motion in groove 45 at which point all peripheral portions of the blade make contact with the groove means and may substantially contact surface 41. For purposes of a more perfect closure, the groove means 44 and 45 is lined with a resilient seal means 57. The arrangement is one substantially to obviate the development of frictional forces while permitting continued flow over side edges of the door in its movement to and from closed position.

Intermediate the segmental portions 49 and 51, the concave side of blade 48 is formed with a further segmental portion 58. To this is attached, by a pin-in-slot lost motion connection 59 one arm of a lever 61. A relatively stationary frame structure 62 provides a pivotal connection 63 for the other arm of lever 61, the lever having an angular configuration with pivotal connection 63 in relatively elevated relation to the axis of pivot stud means 38-39. The structure 62 comprises a pair of mating plate elements 63 and 64 held in an opposing spaced relation by spacer means 65 and rivet or like means 66. The plates 63 and 64 are relatively elongated and dispose longitudinally in duct 10. They have respective turned out feet 67-68 and 69-71 substantially to seat to upper and lower walls of the duct. Further, each plate 63 and 64 is cut away intermediate its ends to define an elongated central opening 72. Further, to either end of opening 72 the plates 63 and 64 are formed with vertically spaced apart laterally projecting arms. Thus, at what may be considered the inner or forward end of structure 62 is an upper pair of projecting arms 73 and a lower pair of projecting arms 74 while at the opposite or outer end of the frame structure is an upper pair of projecting arms 75 and a lower pair of projecting arms 76. At their outer extremities, the arms 73-76 have turned over ends and the sets of arms at opposite ends of the structure are oppositely disposed to present the turned over ends in an opposing relation.

Disposing in the opening 72, in what may be regarded as a forward end thereof is a cylindrical cage 77, an inner of which presents a wall 78 and an outer end of which is open and has an outturned flange 79. A compression spring 81 surrounds the cage 77 and seats at one end on the arms 73-74 while bearing at its other end against flange 79. Also disposing in opening 72, toward the opposite end thereof is another cage or cup shaped member 82 presenting a vertical wall portion 83, a radial flange 84 and a cylindrical projection 85 of relatively reduced diameter. A coil spring 86 seats on arms 75-76, extends in surrounding relation to cylindrical portion 85 and bears at its other end upon flange 84.

Still further disposing in opening 72 and received in the main in cage 77 is a thermostatic power element 87. The details of this element are not here disclosed since it may be selected from one of a variety of such devices available in the commercial market. In its relationship to the machanism of the present invention, however, the power element 87 comprises a cylindrical case 88 longitudinally disposing within opening 72 and seating at one end to the wall 83 of spring cage member 82. The case 88 contains one or more pellets of an amorphous material having the property of relatively powerful expansion when heated. From the opposite end of the case 88 projects a relatively extensible plunger 89. Expansion of the thermally sensitive material in case 88 provides longitudinally directed forces of action and reaction, the latter of which is sustained by spring cage 82 and the former of which effects an axial outwardly thrusting motion of the plunger 89. The plunger 89 projects through the wall 78 of cage 77 and has a radially projecting portion 91 thereon abutting the inner surface of such wall. Beyond wall 78, plunger 89 attaches in a pivotal connection 92 to an arm of lever 61, the point of attachment being adjacent to the connection 63. More particularly, the power element 87 is disposed in the plane of mounting studs 38-39, with plunger 89 projecting axially of the power element in such plane and attaching to lever 61 therein.

Frame 33, structure 62 and associated parts are introduced into duct 10 through one end thereof and are suitably held in place therein. Fasteners 93 and 94, which may be a form of blind rivet as indicated, are installed through fixture 15 and through duct 10 into the upper plate 36 of frame 33. Similar fasteners 95 extend from the under side of the duct through frame floor 37. In a like manner, fasteners 96 and 97 pass through upper and lower walls respectively of the duct 10 to engage and secure the turned over feet 67–71 of frame members 63 and 64 of structure 62.

The thermal power element 87 occupies a position intermediate the walls of duct 10 to be exposed to air flowing through the duct. The cage 77 may have an open work construction to facilitate movement of the air in a contacting relation to the case 88 which is constructed of a heat conductive material. To facilitate a transfer of heat to and from case 88 there may be mounted thereon a circular fin structure 98 which may, if desired, be formed integrally with the case 88.

Figure 5:
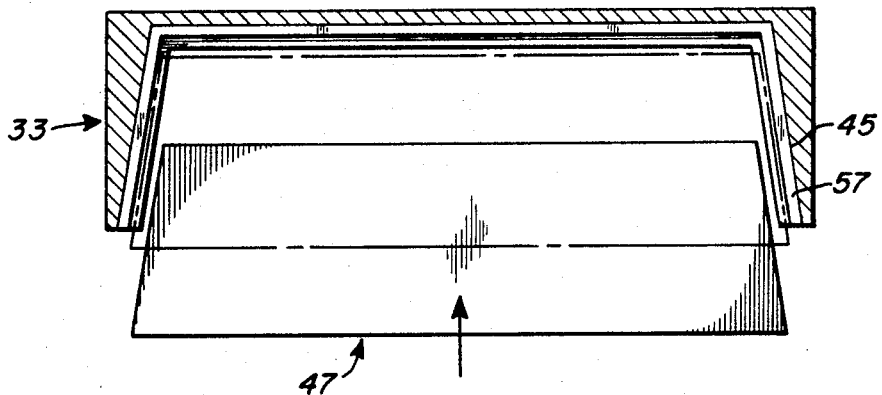
FIG. 5 is a front view, largely diagrammatic, of the assembly shown in FIG. 4.
Figure 6:
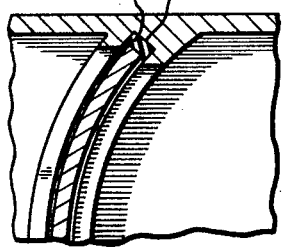
FIG. 6 is a detail view, enlarged with respect to FIG. 3, showing a portion of the door and frame as there seen.

In the operation of the by-pass mechanism, it will be understood that the thermal power element 87 is selected and constructed to apply a thrust to lever 61 at certain temperature values of the flowing air so that flowing air above a selected high temperature value will be denied access to the heat exchanger 17. Further, it will be understood that the compression spring 86 is of a superior strength to spring 81 and therefore yields less readily to applied forces of compression. In what may be regarded as an unheated condition of the thermally sensitive material in case 88 compression spring 81 applies a force to cage 77 which as transmitted through the annular projection 91 on plunger 89 is effective to hold the material in the thermostatic case against expansion. The parts accordingly at this time occupy a retracted position wherein plunger 89 is relatively withdrawn in frame structure 62 and positions connected lever 61 substantially as shown in FIG. 1 wherein the attached door 47 is in a lowered position seating within depression 31 and closing window 32. The opening 46 in frame 33 accordingly is at this time open and the ram air entering duct inlet 14 flows freely longitudinally through the duct and through frame 33 to heat exchanger 17 where it may perform its intended purpose as a coolant with respect to a circulating oil or the like. The concave surface presented by door 47 to the duct interior serves as a guide not only denying flow through window 32 but directing such flow smoothly to and through frame opening 33. If as a result of the "ram rise" phenomenon, or from other causes, the air entering duct 10 increases to undesirably high temperature values the attempted expansion of the material in case 88 can no longer be confined by spring 81. At this point, spring 81 yields and the cage 77 and plunger 89 move in unitary fashion in an outwardly thrusting motion which places the spring 81 under the further compression and which through lever 61 rocks door 47 toward an upward position into frame 33. As it does so, blade 48 uncovers window 32 and moves toward and through grooves 44 toward a position of closure of opening 46, substantially in the manner indicated in FIG. 5. Under continued urging of the power element closing movement of the door 47 continues until it seats within groove means 44–45 effectively closing and sealing opening 46. The parts are then positioned substantially as shown in FIG. 3, with door 47 effectively blocking airflow to the heat exchanger 17 and acting further smoothly to divert such air flow downwardly to the now open window 32. The parts will remain so positioned while the air temperatures remain at an undesirably high temperature and it will be noted in this connection that the thermal power element is continuously exposed to flowing air whether such air flows to the heat exchanger or to the by-pass window 32. Further, should air temperatures continue to rise beyond the value at which door 47 moves to a seated, closing position in frame 33, excess expansion of the thermally sensitive material in case 88 is accommodated by a movement of reactant cage member 82 against the urging of spring 86. It will be evident that in response to lowering air temperatures the parts respond with opposite effect. Thus, as the air temperature drops below a selected value the expansive force exerted by the material in case 88 becomes insufficient to overcome spring 81 whereupon the spring 81 expands, recompressing the material in case 88 and returning door 47 and connected parts from the position shown in FIG. 3 to the alternate or normal position of FIG. 1. Air flow is again permitted to the heat exchanger 17 which again functions with cooling effect upon the circulating oil or the like.

The construction and mounting of the lever 61 provides a mechanical advantage in which a relatively small motion of plunger 89 effects a relatively long arcuate travel of door 47. Further, as previously noted, movement of the door 47 to and from a position of closure in frame 33 is relatively friction free. Also, the door is neither moved to nor held in its alternate positions of adjustment against the pressures of flowing air. Accordingly the power requirements of thermostatic element 87 are relatively low, enabling the use of a small, light weight element which can readily be received within and operate in the confines of duct 10.

The by-pass control mechanism has been disclosed in a preferred physical form. It will be evident, however, that structural changes and modifications are entirely possible without departing from expressed inventive concepts.

What is claimed is:

1. A by-pass mechanism for disposing in an air flow or like duct, including a door frame mounting transversely in said duct and having a through opening therein, a multi-sided door mounted for substantially sliding motion across said frame opening to and from a position of closure thereof, means for mounting said door substantially to relieve it in its motion of the influence of fluid pressure deflecting forces, said door and said frame having cooperative tapering portions which in a closed position deny flow over side edges of said door but which in the movement of said door to and from closed position substantially obviate the development of friction forces and allow relatively free flow over said side edges, a thermostatic power element disposing in said duct in advance of said door frame to be affected by the temperature of the fluid flowing through said duct, and a direct acting operating connection between said thermostat and said door.

2. A by-pass mechanism according to claim 1, wherein the cooperating portions on said door and frame include means defining a raised groove on said frame in a peripheral relation to said frame opening, said door sliding in said groove and side margins of said groove and corresponding side edges of said door having tapering configurations inhibiting contact of said door in said groove until said door is fully received therein.

3. A by-pass mechanism according to claim 2, wherein said groove is on three sides of said opening, the bottom side being open for sliding withdrawal and re-entry of said door, the upper side serving as an abutment to which said door seats in reaching closed position.

4. A by-pass mechanism according to claim 3, wherein said door has a trapezoidal configuration, upper and lower side edges forming the parallel sides and laterally disposing side edges bearing a convergent-divergent relation to one another, corresponding side margins of said groove having a complementary configuration.

5. A by-pass mechanism according to claim 4, wherein said frame has upper and lower walls and interconnecting side walls, said walls having projecting portions defining said through opening and defining said groove.

6. A by-pass mechanism according to claim 5, wherein said projecting portions are arcuate in configuration, said door having a corresponding configuration whereby in a closed position to deflect air flow away from said through opening, the lower wall of said frame being relatively short to allow deflection of the air generally downwardly of the frame.

7. A by-pass mechanism according to claim 6, wherein said duct and frame cooperate in defining a by-pass window depressed below the lower wall of said frame, said door being so mounted that a swinging pivotal movement thereof withdrawing it from said groove carries it to a position closing said window, said door having alternate positions of adjustment opening flow through said frame and through said by-pass window.

8. A by-pass mechanism according to claim 1, wherein said frame has side walls mounting said door for pivotal swinging movement across said through opening, said thermostatic power element disposing to exert a thrust longitudinally of said duct toward said through opening, said direct acting operating connection transmitting a forwardly directed thrust of said power element into a pivotal swinging movement of said door.

9. A by-pass mechanism for disposing in an air flow or like duct, including a door frame mounting transversely in said duct and having a through opening therein, a multi-sided door mounted for substantially sliding motion across said frame opening to and from a position of closure thereof, and means for mounting said door substantially to relieve it in its motion of the influence of fluid pressure deflecting forces, said door and said frame having cooperative tapering portions which in a closed position deny flow over side edges of said door but which in the movement of said door to and from closed position substantially obviate the development of friction forces and allow relatively free flow over said side edges.

10. A by-pass mechanism according to claim 9, wherein the cooperating portions on said door and frame include means defining a raised groove on said frame in a peripheral relation to said frame opening, said door sliding in said groove and side margins of said groove and corresponding side edges of said door having tapering configurations inhibiting contact of said door in said groove until said door is fully received therein.

11. A by-pass mechanism according to claim 10, wherein said groove is on three sides of said opening, the bottom side being open for sliding withdrawal and reentry of said door, the upper side serving as an abutment to which said door seats in reaching closed position.

12. A by-pass mechanism according to claim 1, wherein said door has a trapezoidal configuration, upper and lower side edges forming the parallel sides and laterally disposing said edges bearing a convergent-divergent relation to one another, corresponding side margins of said groove having a complementary configuration.

13. A by-pass mechanism according to claim 12, wherein said frame has upper and lower walls and interconnecting side walls, said walls having projecting portions defining said through opening and defining said groove.

14. A by-pass mechanism according to claim 13, wherein said projecting portions are arcuate in configuration, said door having a corresponding configuration whereby in a closed position to deflect air flow away from said through opening, the lower wall of said frame being relatively short to allow deflection of the air generally downwardly of the frame.

15. A by-pass mechanism according to claim 14, wherein said duct and frame cooperate in defining a by-pass window depressed below the lower wall of said frame, said door being so mounted that a swinging pivotal movement thereof withdrawing it from said groove carries it to a position closing said window, said door having alternate positions of adjustment opening flow through said frame and through said by- pass window.

* * * * *